(12) United States Patent
Choo et al.

(10) Patent No.: US 8,961,001 B2
(45) Date of Patent: Feb. 24, 2015

(54) AGITATOR AND AGITATING HOOK PROVIDED THEREIN

(75) Inventors: Yeon Seok Choo, Daejeon (KR); Hyo Sook Cha, Daejeon (KR); Ye Hoon Im, Daejeon (KR); Byung Woo Choi, Gimcheon-si (KR); Jin Hyun Bae, Daegu (KR)

(73) Assignee: LG Chem, Ltd., Seoul (KR)

( * ) Notice: Subject to any disclaimer, the term of this patent is extended or adjusted under 35 U.S.C. 154(b) by 157 days.

(21) Appl. No.: 13/504,776

(22) PCT Filed: Oct. 29, 2010

(86) PCT No.: PCT/KR2010/007536
§ 371 (c)(1),
(2), (4) Date: Aug. 1, 2012

(87) PCT Pub. No.: WO2011/053049
PCT Pub. Date: May 5, 2011

(65) Prior Publication Data
US 2012/0327740 A1  Dec. 27, 2012

(30) Foreign Application Priority Data
Oct. 29, 2009 (KR) .................. 10-2009-0103833

(51) Int. Cl.
*B01F 7/00* (2006.01)
*B01J 19/00* (2006.01)

(52) U.S. Cl.
CPC ......... *B01F 7/00341* (2013.01); *B01F 7/00208* (2013.01); *B01J 19/0066* (2013.01); *B01J 2219/00779* (2013.01)
USPC .......................................... 366/307; 366/316

(58) Field of Classification Search
CPC ...... B01F 13/002; B01F 7/0025; A01J 15/06; A61C 5/064
USPC ........... 366/270, 291, 307, 325.4, 80, 81, 82, 366/302, 303, 304, 305, 306, 315, 316, 317, 366/309, 312, 313; 241/278.1, 282.1, 241/278.2, 279
See application file for complete search history.

(56) References Cited

U.S. PATENT DOCUMENTS 2,200,997 A * 5/1940 Royle .............................. 366/80
3,115,674 A * 12/1963 Schrenk et al. ................. 366/81
4,838,704 A * 6/1989 Carver .......................... 366/307

FOREIGN PATENT DOCUMENTS

| JP | 53-27167 | 3/1978 |
|---|---|---|
| JP | 55-84137 U | 6/1980 |
| JP | 5-320357 A | 12/1993 |
| JP | 05320357 A | 12/1993 |
| JP | 09052035 A | 2/1997 |
| JP | 10192673 A | 7/1998 |
| WO | WO 2008/041335 A1 | 4/2008 |

* cited by examiner

*Primary Examiner* — Tony G Soohoo
*Assistant Examiner* — Anshu Bhatia
(74) *Attorney, Agent, or Firm* — McKenna Long & Aldridge, LLP

(57) ABSTRACT

Provided are an agitator and an agitating hook provided therein. The agitator includes a rotary shaft rotatably installed in a reactor, rotor blades installed at an outer circumference of the rotary shaft and rotated with the rotary shaft to agitate a material therein, and an agitating hook constituted by a pair of members spaced apart from each other at an inner wall of the reactor and through which the rotor blades pass. Here, a gap between the agitating hook is larger at an outlet port through which the rotor blade leaves than at an inlet port through which the rotor blade enters. Since a pressure is uniformly applied from the inlet port through which the rotor blade enters to the outlet port through which the rotor blade leaves, a torsional moment applied to the agitating hook is minimized. Therefore, it is possible to improve durability of the agitating hook and increase reliability of products.

10 Claims, 6 Drawing Sheets

(a)　　　　　　　　　　(b)

(a)　　　　　　　　　　(b)

AGITATOR AND AGITATING HOOK PROVIDED THEREIN

This application is a National Stage Entry of International Application No. PCT/KR2010/007536, filed Oct. 29, 2010, and claims the benefit of Korean Application No. 10-2009-0103833, filed on Oct. 29, 2009, which are hereby incorporated by reference for all purposes as if fully set forth herein.

BACKGROUND

1. Field of the Invention

The present invention relates to an agitator, and more particularly, to an agitator capable of improving durability of an agitating hook for agitating a high viscosity material with rotor blades, and an agitating hook provided therein.

2. Discussion of Related Art

In general, polymerization refers to a reaction in which small molecules are repeatedly added to form a single long continuous chain. Here, a small unit molecule is referred to as a unit body. An agitator is needed in a polymerization reactor, which performs polymerization, to agitate a high viscosity fluid or gel-type material having a viscosity higher than a predetermined level.

FIG. 1 is a perspective view showing a configuration of a conventional agitator, and FIG. 2 is an enlarged perspective view of a portion of the agitator shown in FIG. 1.

As shown in the drawings, the agitator has a substantially cylindrical shape, in which an agitation member is installed. The agitator shown in FIG. 1 may be installed in plural in the cylinder to perform agitation. A rotary shaft 3 is rotatably installed at a center in an inner space defined by an inner wall 1 of the agitator. The rotary shaft 3 receives power from a power source such as a motor to be rotated.

A plurality of rotor blades 5 are installed at an outer circumference of the rotary shaft 3. The plurality of rotor blades 5 may be installed at the outer circumference of the rotary shaft 3 at a predetermined interval. The rotary blades 5 may be rotated together with the rotary shaft 3 to substantially agitate a high viscosity material. The rotary blade 5 has a substantially fan-shape.

In addition, agitating ribs 7 are formed at ends of the rotary blades 5, respectively. The agitating ribs 7 perpendicularly project from the ends of the rotor blades 5. Referring to FIG. 3, the agitating rib 7 perpendicularly extends from the end of the rotor blade 5 in both directions. Meanwhile, the agitating rib 7 passes through a rib passing part 13, which will be described.

An agitating hook 10 is installed at the inner wall 1 to agitate and crush a high viscosity material. The agitating hook 10 may be provided around the inner wall 1 in plural. As shown in FIG. 2, the agitating hook 10 is formed of a pair of symmetrical members spaced apart a predetermined distance from each other. In addition, the rotor blade 5 and the agitating rib 7 pass through the agitating hook 10 to agitate and crush the high viscosity material.

Referring to FIG. 2, the agitating hook 10 includes support parts 12 projecting from the inner wall 1 of the reactor and spaced apart a predetermined gap from each other, connecting parts 14 extending from tips of the support parts 12 in facing directions, and parallel parts 16 parallelly extending from tips of the connection parts 14.

In addition, the rib passing part 13 through which the agitating rib 7 passes is formed between the support parts 12, and a blade passing part 17 through which the rotor blade 5 passes is formed between the parallel parts 16. The rib passing part 13 has a relatively larger width than that of the blade passing part 17, because a width of the agitating rib 7 is larger than that of the rotor blade 5.

In order to prevent interference between the agitating hook 10 and the rotor blade 5 during rotation, a predetermined gap must be formed therebetween. This is also similar to the agitating rib 7. This is shown in FIG. 3 well. That is, the high viscosity material passes through the gap formed between the agitating hook 10 and the rotary blade 5 to be crushed.

Specifically describing the agitation and crush operation of the agitating hook 10, first, a high viscosity fluid or gel-type material is inserted into the agitator. In general, a high viscosity material agitated in the agitator has a viscosity of 10,000 cp or more. Such a material is likely to be changed from a liquid phase into a solid phase so that the volume thereof is abruptly expanded.

When the high viscosity material is input, the material is conveyed from an inlet port to an outlet port and sequentially converted from the liquid phase into a gel type and from the gel type into a solid phase. In particular, as described above, the volume is abruptly expanded while the gel-type is converted into the solid phase. The solid lumps pass through the agitating hooks 10 to be agitated and crushed by rotation of the rotor blades 5.

However, the conventional art as described above has the following problems.

As shown in FIGS. 3 and 4, the agitating hook 10 through which the rotor blade 5 passes has a constant gap from an inlet port through which the rotor blade 5 enters and an outlet port through which the rotor blade 5 leaves. Since the gap between the rotor blade 5 and the agitating hook 10 is constant, a pressure applied to the agitating hook 10 is increased from the inlet port to the outlet port as shown in FIG. 4.

When the pressure applied to the agitating hook 10 is not constant and increased as it goes toward the outlet port, a torsional moment is applied to the agitating hook 10 due to a difference in pressure. That is, the agitating hook 10 receives a force to be rotated in an arrow direction shown in FIG. 5.

Since such a moment is repeatedly applied to the agitating hook 10 whenever the rotor blades 5 continuously pass through the agitating hook 10, the agitating hook 10 may be failed due to fatigue. In particular, when the moment is continuously applied to the support parts 12 of the agitating hook 10, the agitating hook 10 may be broken to be separated from the inner wall 1.

Eventually, when the agitating hook 10 is broken, since the agitator cannot be normally operated, agitation efficiency is decreased and repair cost is increased.

SUMMARY OF THE INVENTION

In order to solve the problems, the present invention is directed to an agitator having a structure capable of minimizing a torsional moment applied to an agitating hook, and an agitating hook provided therein.

Additional aspect and advantages of the present invention will be set forth in part in the description which follows and, in part, will be obvious from the description, or may be learned by practice of the invention.

In example embodiments, an agitator includes: a rotary shaft rotatably installed in a reactor; rotor blades installed at an outer circumference of the rotary shaft and rotated with the rotary shaft to agitate a material therein; and an agitating hook spaced apart from each other at an inner wall of the reactor and through which the rotor blades pass. Here, a gap between the agitating hook is larger at an outlet port through which the rotor blade leaves than at an inlet port through which the rotor blade enters.

The gap between the agitating hook may be increased from the inlet port through which the rotor blade enters to the outlet port.

Inclined surfaces may be formed at facing surfaces of the agitating hook so that the gap is increased from the inlet port through which the rotor blade enters to the outlet port.

The rotor blade may further include an agitating rib perpendicularly extending from an end of the rotor blade.

A blade passing part through which the rotor blade passes and a rib passing part through which the agitating rib passes may be formed between the agitating hook, and the blade passing part may have a width smaller than that of the rib passing part.

The agitating hook may include: support parts projecting form the inner wall of the reactor at a predetermined interval and between which the rib passing part is formed; connection parts extending from tips of the support parts in facing directions; and parallel parts parallelly extending from tips of the connection parts and between which the blade passing part is formed.

Inclined surfaces may be formed at facing surfaces of the parallel parts so that the gap is increased from the inlet port through which the rotor enters and the outlet port.

The parallel parts may further include extension parts perpendicularly extending from tips of the parallel parts in opposite directions.

The outlet port may have a width 1.0 to 2.0 times larger than that of the inlet port.

The outlet port may have a width 1.3 to 1.5 times larger than that of the inlet port.

The agitating hook may be formed of a stainless steel material.

An agitating hook includes: support parts projecting from an inner wall of a reactor at a predetermined interval; connecting parts extending from tips of the support parts in facing directions; and parallel parts parallelly extending from tips of the connecting parts to have a width smaller than that of the support parts.

A rotor installed at a reactor may pass between the support parts, and an outlet port through which the rotor blade leaves may have a width 1.0 to 2.0 times larger than that of an inlet port through which the rotor blade enters.

The outlet port may have a width 1.3 to 1.5 times larger than that of the inlet port.

Inclined surfaces may be formed at facing surfaces of the agitating hook so that the width is increased from the inlet port through which the rotor blade enters to the outlet port.

BRIEF DESCRIPTION OF THE DRAWINGS

The above and other objects, features and advantages of the present invention will become more apparent to those of ordinary skill in the art by describing in detail example embodiments thereof with reference to the attached drawings, in which.

DETAILED DESCRIPTION OF EXAMPLE EMBODIMENTS

Figure 1:
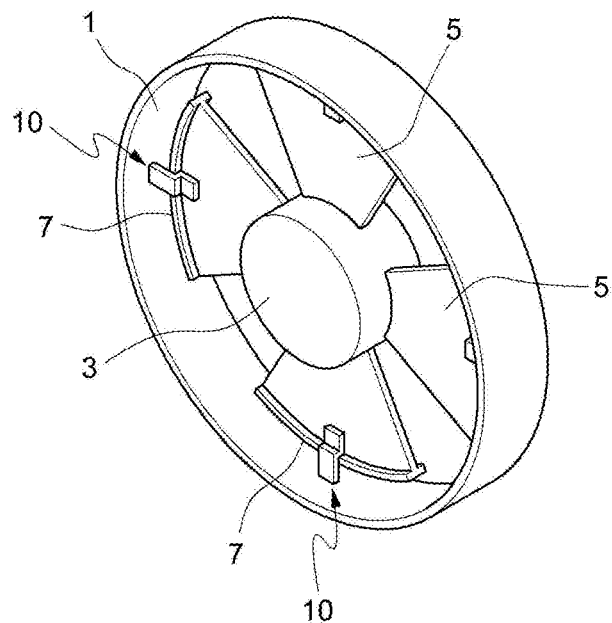
FIG. 1 is a perspective view showing a configuration of a conventional agitator.
Figure 2:
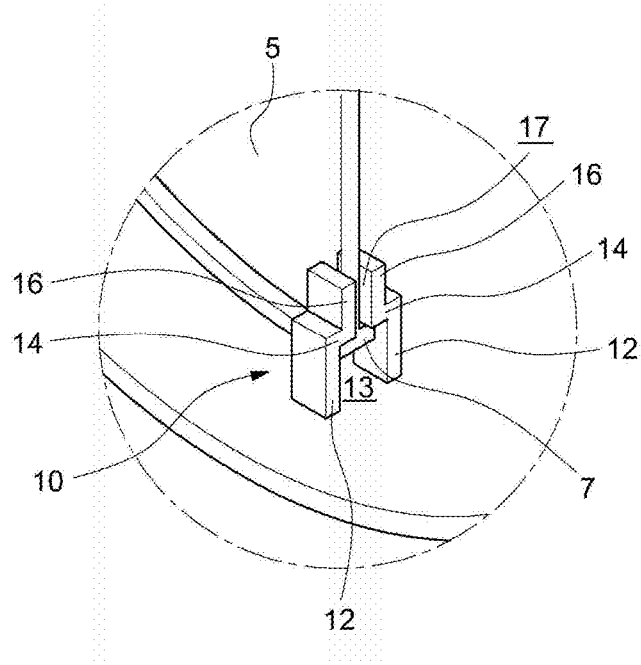
FIG. 2 is an enlarged perspective view of the agitator shown in FIG. 1.
Figure 3:
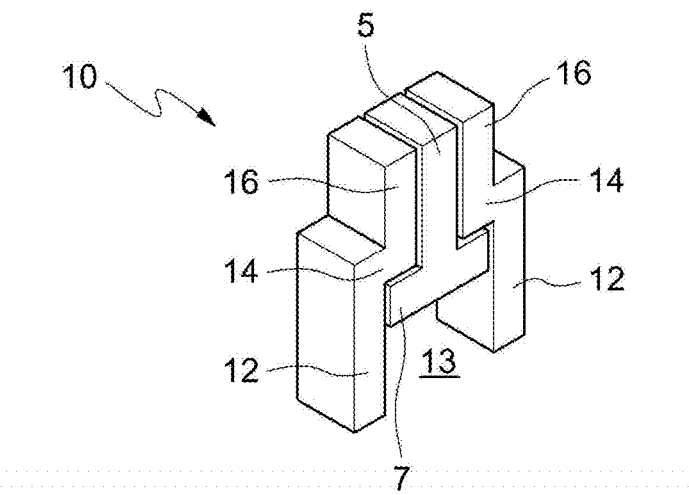
FIG. 3 is a perspective view showing a state in which a rotor blade passes through an agitating hook of the conventional agitator.

Hereinafter, example embodiments of the present invention will be described in detail. However, the present invention is not limited to the embodiments disclosed below, but can be implemented in various forms. The following embodiments are described in order to enable those of ordinary skill in the art to embody and practice the present invention.

Hereinafter, an exemplary embodiment of an agitator and an agitating hook provided therein in accordance with the present invention will be described in detail with reference to the accompanying drawings. In addition, like elements of the present invention are designated by like reference numerals of the conventional art shown in FIGS. 1 to 5.

Figure 6:
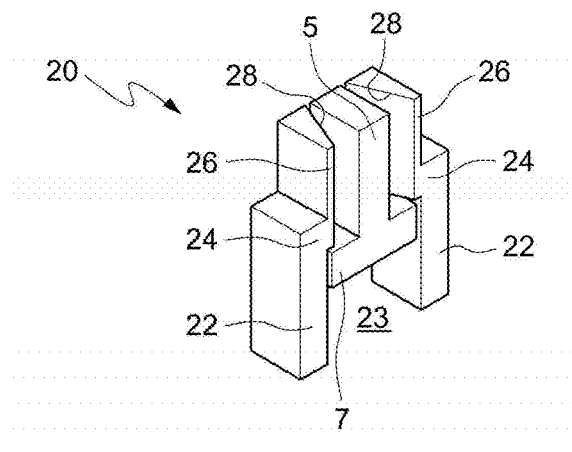
FIG. 6 is a perspective view showing an agitating hook and a rotor blade in accordance with an exemplary embodiment of the present invention.
Figure 7:
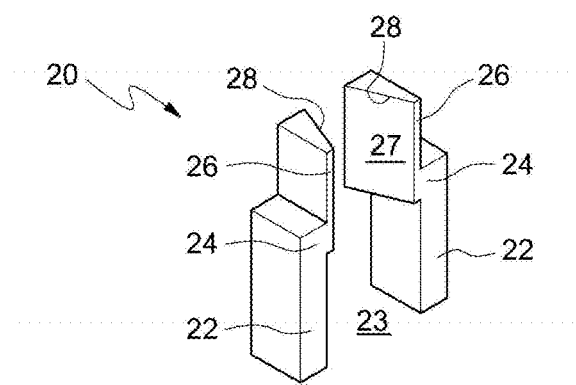
FIG. 7 is a perspective view showing the agitating hook in accordance with the present invention.

FIG. 6 is a perspective view showing an agitating hook and a rotor blade in accordance with an exemplary embodiment of the present invention, and FIG. 7 is a perspective view showing the agitating hook in accordance with the present invention.

As shown, an agitating hook 20 in accordance with the present invention includes support parts 22 projecting from an inner wall 1 of a reactor at a predetermined interval and defining a rib passing part 23 formed therebetween, connection parts 24 extending from tips of the support parts 22 in facing directions, and parallel parts 26 parallelly extending from tips of the connection parts 24 and defining a blade passing part 27 formed therebetween.

In this embodiment, inclined surfaces 28 are formed at facing surfaces of the parallel parts 26. The inclined surfaces 28 is formed to minimize a torsional moment applied to the agitating hook 20, and uniformly distribute a pressure applied to facing surfaces of the parallel parts 26.

Figure 4:
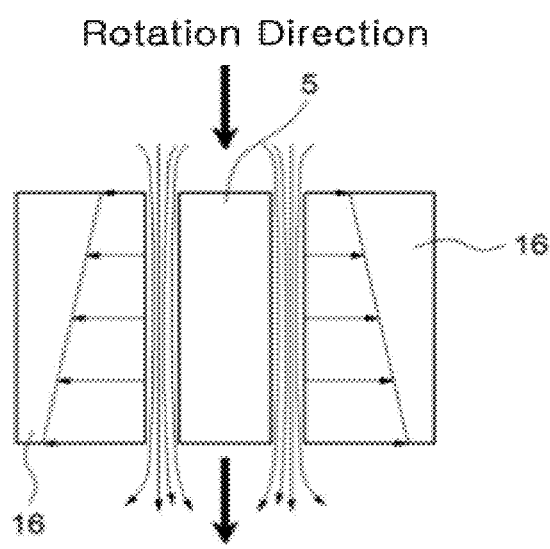
FIG. 4 is a plan view showing a fluid flow when the rotor blade passes through the agitating hook of the conventional agitator.
Figure 5:
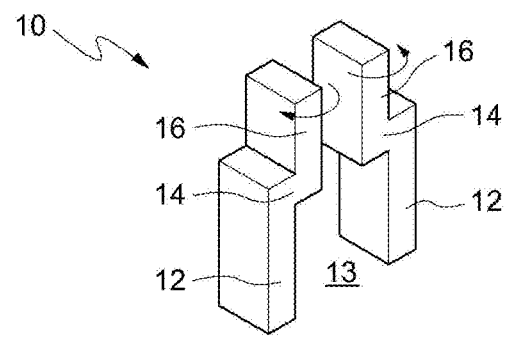
FIG. 5 is a perspective view showing generation of torsion of the agitating hook of the conventional agitator.

In other words, during a process of passing the rotor blade 5 between the parallel parts 26, an inlet port through which the rotor blade 5 has a smaller width than an outlet port through which the rotor blade 5 leaves to offset the pressure strongly applied to the outlet port (see FIG. 4). The inclined surfaces 28 are configured such that a gap therebetween is increased from the inlet port to the outlet port through which the rotor blade 5 passes, i.e., increased along the straight surface. In addition, the blade passing part 27 between the parallel parts 26 also has a width which is increased from the inlet port to the outlet port through which the rotor blade 5 passes.

Meanwhile, the inclined surfaces 28 must not be the straight surfaces as described above but may have only the width larger at the outlet port than at the inlet port through which the rotor blade 5 passes.

Figure 8:
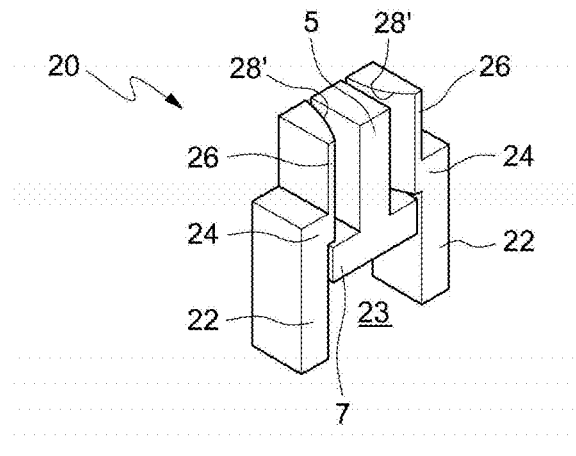
FIGS. 8 and 9 are perspective views showing other embodiments of an agitating hook in accordance with the present invention.
Figure 9:
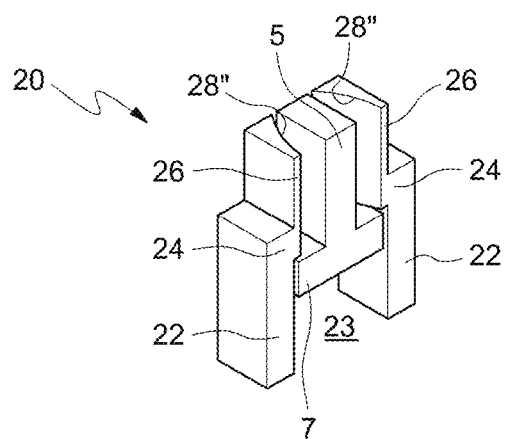

For this, FIGS. 8 and 9 show other embodiments of the agitating hook in accordance with the present invention. Referring to FIGS. 8 and 9, inclined surfaces 28' and 28" formed at facing surfaces of the parallel parts 26 may have curved shapes as shown in FIGS. 8 and 9 such that the width is increased from the inlet port to the outlet port in concave or convex shapes. Of course, the inclined surfaces 28 may be designed to have different shapes, in addition to the embodiments shown in the drawings.

Figure 10:
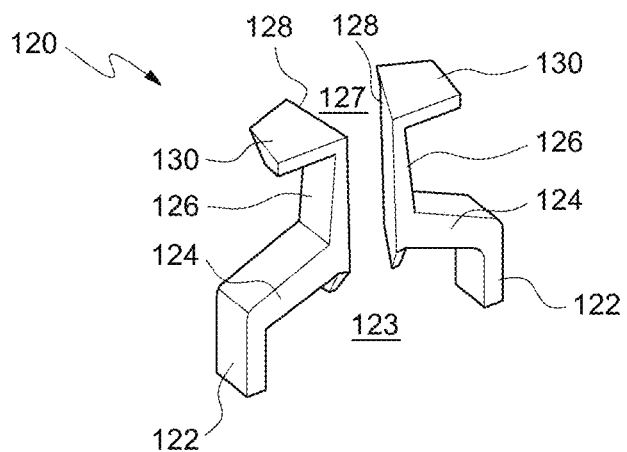
FIG. 10 is a perspective view showing an actual design of the agitating hook in accordance with the present invention.

For reference, FIG. 10 shows an actual design of the agitating hook in accordance with the present invention. Here, detailed description of the constitution corresponding to FIG. 6 will not be repeated.

Referring to FIG. 10, the entire shape of the agitating hook 120 is similar to that of FIG. 6. Reviewing the different parts, unlike FIG. 6, connection parts 124 of the agitating hook 120 extends in an inclined direction at a predetermined angle with respect to the support parts 122, not perpendicular with respect to the support part 122. In addition, extension parts 130 further extend from tips of the parallel parts 126 in opposite directions. Of course, FIG. 10 merely shows an example of the actual design, but not limited thereto.

In addition, in the agitating hook 20 in accordance with the present invention, the outlet port through which the rotor blade 5 leaves has a width 1.0 to 2.0 times larger than that of the inlet port. In addition, the outlet port through which the rotor blade 5 leaves may have a width 1.3 to 1.5 times larger than that of the inlet port. This is because the high viscosity material can be more effectively agitated and crushed and the torsional moment applied to the agitating hook 20 can be minimized under the condition that the inlet port and the outlet port have the widths of the above proportion.

Meanwhile, the agitating hook 20 in accordance with the present invention may be formed of the following material. The agitating hook 20 may be formed of stainless steel (for example, SUS). The stainless steel is a steel member having good corrosion-proof, machinability and weldability. In this embodiment, duplex having good strength and corrosion-proof, among the stainless steel, is used. The duplex is a material that is widely used in a field such as a marine power plant in which corrosion due to salt may occur.

Figure 11:
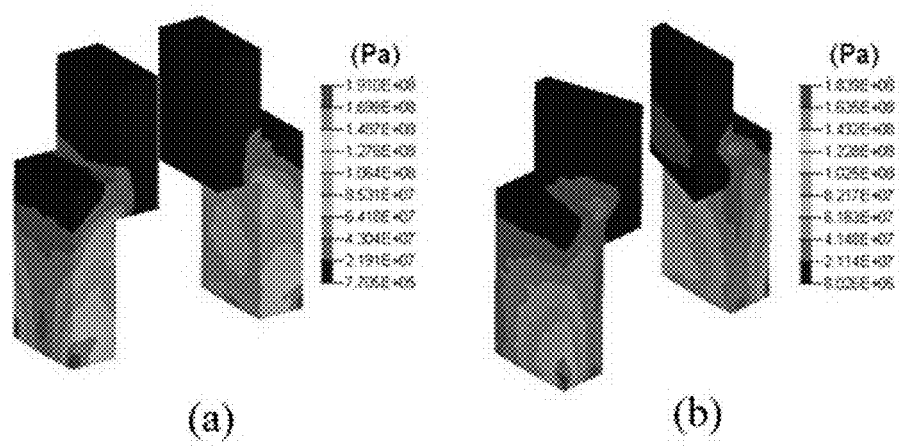
FIG. 11 shows photographs for comparing stress distributions of the agitating hook in accordance with the present invention and the conventional agitating hook.
Figure 12:
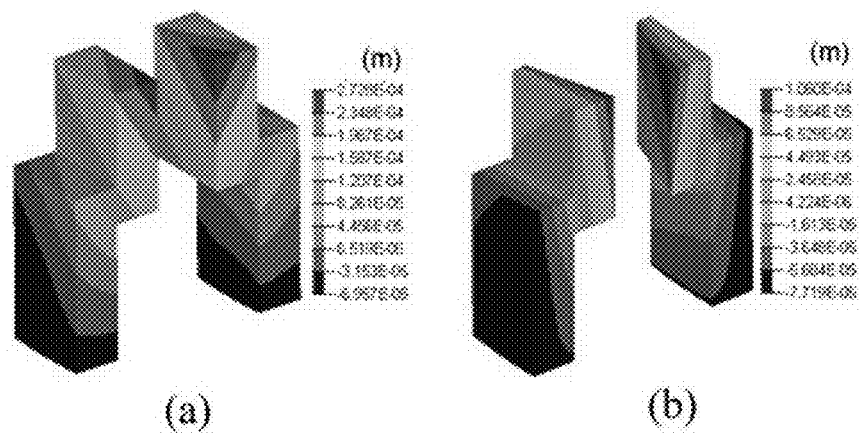
FIG. 12 shows photographs for comparing strain distributions of the agitating hook in accordance with the present invention and the conventional agitating hook.

Next, FIGS. 11 and 12 shows graphs for comparing stress distributions and strain distributions of the agitating hook in accordance with the present invention and the conventional agitating hook. For reference, (a) shows the conventional agitating hook, and (b) shows the agitating hook in accordance with the present invention.

Referring to the figures, in FIG. 11, (a) shows that both ends of the support parts 22 have very high stresses, and (b) shows that only one end adjacent to the outlet port has a high stress. In addition, it will be appreciated that the entire stress is represented as low in (b).

Further, in FIG. 12, it can be seen that strain generated at an outer side of the support parts 22 is remarkably reduced at (b) than at (a). In addition, it will be appreciated that strain generated from the inclined surfaces 28 of the parallel parts 26 is reduced at (b) than at (a).

Actually, through analysis of FIGS. 11 and 12, it will be appreciated that the stress of the agitating hook in accordance with the present invention is reduced to 70% and the strain is also reduced to 10% in comparison with the conventional agitating hook.

As can be seen from the foregoing, an agitating hook of the present invention through which a rotor blade passes includes an outlet port having a width larger than that of the inlet port. Since the pressure is uniformly applied from the inlet port of the agitating hook through which the rotor blade enters to the outlet port through which the rotor blade leaves, a torsional moment applied to the agitating hook can be minimized. Therefore, it is possible to improve durability of the agitating hook and increase reliability of products.

While the invention has been shown and described with reference to certain example embodiments thereof, it will be understood by those skilled in the art that various changes in form and details may be made therein without departing from the spirit and scope of the invention as defined by the appended claims.

What is claimed is:

1. An agitator comprising:
   a rotary shaft rotatably installed in a reactor;
   rotor blades installed at an outer circumference of the rotary shaft and rotatable with the rotary shaft to agitate a material therein; and
   an agitating hook including a pair of members that are spaced apart from each other at an inner wall of the reactor and, through which the rotor blades pass,
   wherein a gap between the pair of members of the agitating hook is larger at an outlet port through which the rotor blades leave than at an inlet port through which the rotor blades enter, and
   wherein the rotor blades further comprise an agitating rib perpendicularly extending from an end of the rotor blades.

2. The agitator according to claim 1, wherein the gap between the pair of members of the agitating hook is gradually increased from the inlet port through which the rotor blades enter to the outlet port.

3. The agitator according to claim 2, wherein inclined surfaces are formed at facing surfaces of the pair of members of the agitating hook so that the gap is gradually increased from the inlet port through which the rotor blades enter to the outlet port, and wherein the inclined surfaces have curved shapes.

4. The agitator according to claim 1, wherein a blade passing part through which the rotor blade passes and a rib passing part through which the agitating rib passes are formed between the agitating hook, and the blade passing part has a width smaller than that of the rib passing part.

5. The agitator according to claim 4, wherein the pair of members of the agitating hook comprises:
   support parts projecting from the inner wall of the reactor at a predetermined interval and between which the rib passing part is formed;
   connection parts extending from tips of the support parts in facing directions; and
   parallel parts parallelly extending from tips of the connection parts and between which the blade passing part is formed.

6. The agitator according to claim 5, wherein inclined surfaces are formed at the facing surfaces of the parallel parts so that the gap is increased from the inlet port through which the rotor enters to the outlet port.

7. The agitator according to claim 6, wherein the parallel parts further comprise extension parts perpendicularly extending from tips of the parallel parts in opposite directions.

8. The agitator of claim 1, wherein the outlet port has a width 1.0 to 2.0 times larger than that of the inlet port.

9. The agitator of claim 8, wherein the outlet port has a width 1.3 to 1.5 times larger than that of the inlet port.

10. The agitator according to claim 9, wherein the agitating hook is formed of a stainless steel material.

\* \* \* \* \*